(12) United States Patent  (10) Patent No.: US 8,111,606 B2
Fery et al.  (45) Date of Patent: Feb. 7, 2012

(54) OPTICAL STORAGE MEDIUM COMPRISING A MULTILEVEL DATA LAYER

(75) Inventors: Christophe Fery, Niedereschach (DE); Larisa von Riewel, Villingen-Schwennigen (DE); Gael Pilard, Moenchweiler (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/736,005

(22) PCT Filed: Mar. 5, 2009

(86) PCT No.: PCT/EP2009/052586
§ 371 (c)(1),
(2), (4) Date: Aug. 31, 2010

(87) PCT Pub. No.: WO2009/109614
PCT Pub. Date: Sep. 11, 2009

(65) Prior Publication Data
US 2011/0002218 A1  Jan. 6, 2011

(51) Int. Cl.
*G11B 7/24* (2006.01)
(52) U.S. Cl. ............... 369/275.4; 369/109.01
(58) Field of Classification Search .......... 369/103, 369/109.01, 109.02, 94, 275.2, 275.4, 59.23, 369/59.25, 13.3–13.4, 13.54, 13.55
See application file for complete search history.

(56) References Cited

U.S. PATENT DOCUMENTS

| 2005/0079313 A1 | 4/2005 | Kim et al. |
| 2005/0157631 A1 | 7/2005 | Lee et al. |
| 2005/0281177 A1* | 12/2005 | Verschuren et al. ....... 369/275.1 |
| 2007/0081443 A1* | 4/2007 | Kikukawa et al. ............ 369/126 |
| 2007/0140087 A1* | 6/2007 | Fukuzawa et al. ......... 369/59.11 |

FOREIGN PATENT DOCUMENTS

| EP | 1067534 | 1/2001 |
| EP | 1074984 | 2/2001 |

* cited by examiner

Primary Examiner — Thang Tran
(74) Attorney, Agent, or Firm — Myers Wolin, LLC

(57) ABSTRACT

The optical storage medium comprises a substrate layer, a data layer, and a nonlinear layer with a super-resolution structure disposed on the data layer, wherein pits and lands having a size above a diffraction limit of a pickup for reading of the data establish a first and a second level of the data layer, and pits and lands having a size below the diffraction limit of the pickup are arranged on a further level of the data layer. In a preferred embodiment, pits having a size below the diffraction limit are arranged on a third level and lands having a size below the diffraction limit are arranged on a fourth level of the data layer. The optical storage medium is in particular a read-only optical disc comprising a phase-change material, for example AgInSbTe, for providing the super-resolution effect.

10 Claims, 3 Drawing Sheets

OPTICAL STORAGE MEDIUM COMPRISING A MULTILEVEL DATA LAYER

This application claims the benefit, under 35 U.S.C. §365 of International Application PCT/EP2009/052586, filed Mar. 5, 2009, which was published in accordance with PCT Article 21(2) on Sep. 11, 2009 in English and which claims the benefit of European patent application No. 08102391.3, filed Mar. 7, 2008.

TECHNICAL FIELD OF THE INVENTION

The present invention relates to an optical storage medium comprising a substrate layer, a data layer and a nonlinear layer with a super-resolution structure arranged above the data layer. The data layer comprises in particular pits and lands having a size above a diffraction limit and pits and lands having a size below a diffraction limit of a pickup for reading of the data arranged on the data layer.

BACKGROUND OF THE INVENTION

Optical storage media are media in which data are stored in an optically readable manner by means of a laser and an optical detector, for example a photodetector, being integrated within a pickup. The detector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0.85 is used. On the Blu-Ray disc a track pitch of 320 nm and a mark length from 2T to 8T or 9T is used, where T is the channel bit length and wherein 2T corresponds with a minimum mark length of 138-160 nm.

The spatial resolution limit of optical instruments as described by the Abbe theory is about lambda/2NA, which is lambda/2NA=238 nm for a Blu-Ray type pickup having a laser wavelength lambda=405 nm and a numerical aperture NA=0.85. The diffraction limit for the read out of the high frequency (HF) data signal of a Blu-Ray disc, a higher resolution can be obtained because of the differential signal detection, when the laser beam moves over the pits and lands of a track on the Blu-Ray disc. By providing a reference level for the HF read out signal, very small amplitude changes can be detected, in accordance with the different reflectivity of the pits and lands, which theoretically allows to detect pits with a Blu-Ray type pickup having a size of about lambda/4NA=120 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the diffraction limit of lambda/4NA of a corresponding optical pickup The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super resolution near-field structure formed of a metal oxide, a polymer compound or a phase change layer comprising a GeSbTe or a AgInSbTe are known.

BRIEF SUMMARY OF THE INVENTION

The optical storage medium comprises a substrate layer, a data layer with a pit/land data structure arranged on tracks on the substrate layer, and a non-linear layer with a super-resolution structure disposed on the data layer, wherein pits and lands having a size above a diffraction limit of a corresponding pickup for reading of the data of the data layer correspond with a first and a second level of the data layer, and pits and lands having a size below the diffraction limit of the pickup are arranged on a further level of the data layer. The super-resolution structure comprises in particular a phase change material, for example a chalcogenide material providing an "aperture" type super-resolution mechanism, when irradiated with a high intensity laser beam of the pickup. With the additional level of the pits and lands having the size below the diffraction limit, an inversed data structure is provided for the smallest pits and lands on the optical storage medium, to solve the problem of the inversed signal of the smallest pits and lands of the read out signal when reading the data of the optical storage medium. This allows a correct decoding of the data as arranged on the tracks of the data layer of the optical storage medium.

In a preferred embodiment, the lands having a size above the diffraction limit constitute the first level of the data layer, pits having a size above the diffraction limit constitute the second level of the data layer, pits having a size below the diffraction limit constitute a third level and lands having a size below the diffraction limit constitute a fourth level of the data layer. The optical storage medium is in particular a read-only optical disc, on which the data layer of the optical disc is embossed by using a stamper comprising a corresponding four level data structure. The pits and lands having a size below the diffraction limit are in particular 2T and/or 3T pits and lands and the pits and lands having a size above the diffraction limit are 4T to 8T pits and lands of a track.

For the read out of the high frequency data signal, a higher resolution can be obtained because of the differential signal detection, when a laser beam moves over the pits and lands of a track on the optical storage medium. By providing a reference level for the high frequency read out signal, very small amplitude changes can be detected, in accordance with the different reflectivity of the pits with regard to the land, which allows to detect pits with a Blu-Ray type pickup having a size of about lambda/4NA=120 nm.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
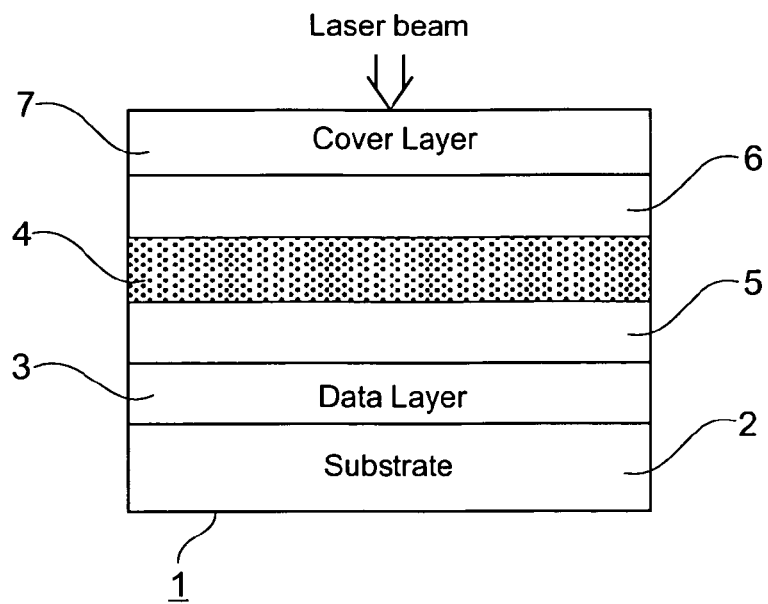
FIG. 1 an optical storage medium in a sectional view with a layer stack comprising a substrate, a data layer and a non-linear layer, FIG. 2 spectral distributions of HF data signals of super-resolution discs comprising a non-linear AgInSbTe layer and a non-linear InSb layer, FIG. 3 signal amplitudes of an AgInSbTe and a InSb super-resolution disc comprising a sequence of 20 2T pits, separated each by a 2T land, FIG. 4 a calculated HF signal for a random sequence of pits and lands of a super-resolution disc comprising an InSb non-linear layer, FIG. 5 a calculated HF signal for a random sequence of pits and lands of a super-resolution disc comprising a AgInSbTe non-linear layer, and FIG. 6 a four level data layer of an optical storage medium comprising a non-linear layer with a phase change material as a super-resolution layer.

In FIG. 1 an optical storage medium 1 is shown in a cross section in a simplified manner. The optical storage medium 1 is for example a read-only (ROM) optical storage disc. On a substrate 2 a data layer 3 is arranged which may comprise a reflective metallic layer, for example an aluminum or silver layer. The data layer 3 has a data structure consisting of marks and spaces arranged on essentially parallel tracks. In the case of a ROM disc, the marks and spaces consist of pits and lands, the pits being molded or embossed on the surface of substrate 2 representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 is for example a mask layer comprising a super-resolution structure, e.g. a super-resolution near-field structure (Super-RENS). The optical storage medium 1 is in particular an optical disc having a size similar to BDs and CDs.

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The first and second dielectric layers 5, 6 comprise for example the material ZnS—SiO$_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with another nonlinear effect, for example utilizes an effect providing an increased reflectivity of the nonlinear layer 4 when irradiated with a laser beam. The layers of the storage medium 1 are arranged in particular as a layer stack.

The super-resolution effect allows to detect pits, which have a size, in particular a length, which is below the diffraction limit of a corresponding apparatus for reading of the data of the optical storage medium. It has been demonstrated that the super-resolution detection of an optical disc comprising a phase change material or a semiconductor material is related to a local change of the optical properties of the non-linear layer 4. For phase change materials, for example AgInSbTe, it is assumed that the temperature increase due to the focus laser spot is responsible for the super-resolution effect, which provides an aperture only in a small center of the laser spot. This is a priori due to a low thermal conductivity and a strong optical non-linearity of the material.

This effect is also assumed for other chalcogenide materials, which comprise a chalcogenide element like sulphur, selenium, tellurium and one or several more electropositive elements like arsenic, germanium, phosphor or antimony. The chalcogenide materials are glasslike materials which show two stable phases, an amorphous and a crystalline phase. By heating a chalcogenide material with a high intensity laser beam, a phase transition from the crystalline to the amorphous phase is provided. For a super-resolution optical disc, the intensity of the laser beam of a corresponding optical pickup is adjusted such, that only for a small centre part of the laser spot on the storage medium a phase transition is provided for providing an "aperture type" super-resolution effect.

Also optical super-resolution discs comprising a semiconductor material as a super-resolution structure have been investigated, and in particular for III-V semiconductors having a low activation threshold, for example InSb, good results could be obtained. For the semiconductor materials, it is assumed that the high light intensity of a laser beam shifts electrons from the valence band to the conduction band, which increases the reflectivity of the semiconductor material. The change in reflectivity is dependent whether a pit or a land is arranged in the near-field below on the data layer.

With ROM discs comprising an alternating pattern of 80 nm pits and lands on the data layer, a carrier to noise ratio of about 40 db could be obtained for InSb as well as for AgInSbTe as the super-resolution structure, when a sufficiently high laser power was provided for triggering the super-resolution effect. Tests were made also with random pit/land patterns and a bit error rate of about $1 \cdot 10^{-3}$ was obtained for the semi-conductor based InSb disc. But it was impossible to decode the data pattern on the phase change based AgInSbTe disc.

Figure 2:
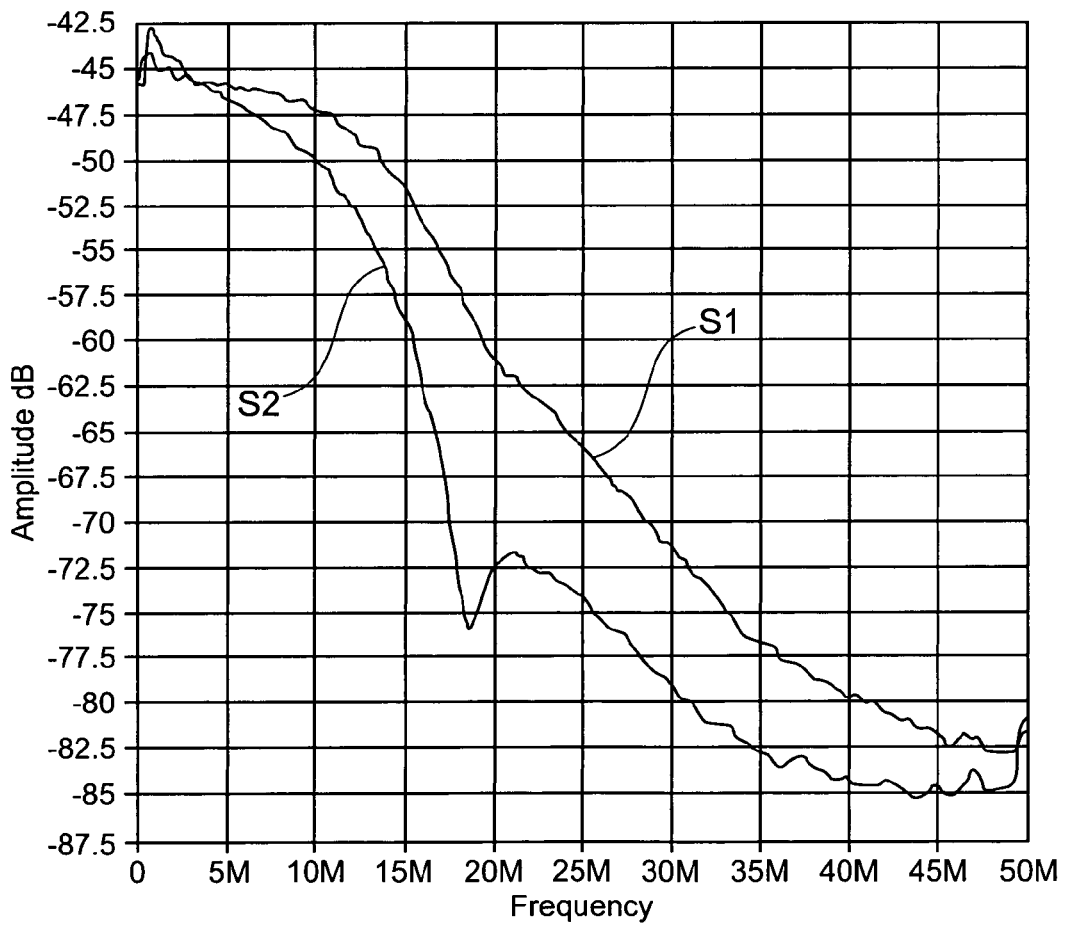

When investigating the spectral distribution of high frequency (HF) data signals corresponding to random data patterns of super-resolution discs, a surprising effect was revealed for the discs with the AgInSbTe material, as shown in FIG. 2. Signal S1 is a spectral distribution of the HF signal of an InSb super-resolution disc, which shows a smooth decay for frequencies above 10 MHz. But for the disc with the AgInSbTe phase change material, a dip occurs at about 18 MHz, signal S2, which frequency corresponds essentially with the diffraction limit of the optical pickup. Also, at the frequency of 30.7 MHz, which corresponds with the HF signal of 2T pits having a length of 80 nm, the amplitude of signal S2 is about 7.5 db below the amplitude of signal S1. It seems therefore that for the AgInSbTe disc, an interference occurs between the detection of pits and lands having a size above the diffraction limit and of pits and lands having a size below the diffraction limit of the pickup, which reduces the detectability of the pits having a size below the diffraction limit.

For obtaining the signals S1 and S2, super-resolution discs were used with a random data pattern with pits and lands based on a channel bit length of 40 nm. Also, the bit error rate was measured for the discs. For the semiconductor based disc a bit error rate as low as 1.10–3 was obtained while no decoding was possible for the disc with the AgInSbTe phase change material. Otherwise, the disc with the AgInSbTe material showed a high carrier-to-noise ratio.

Figure 3:
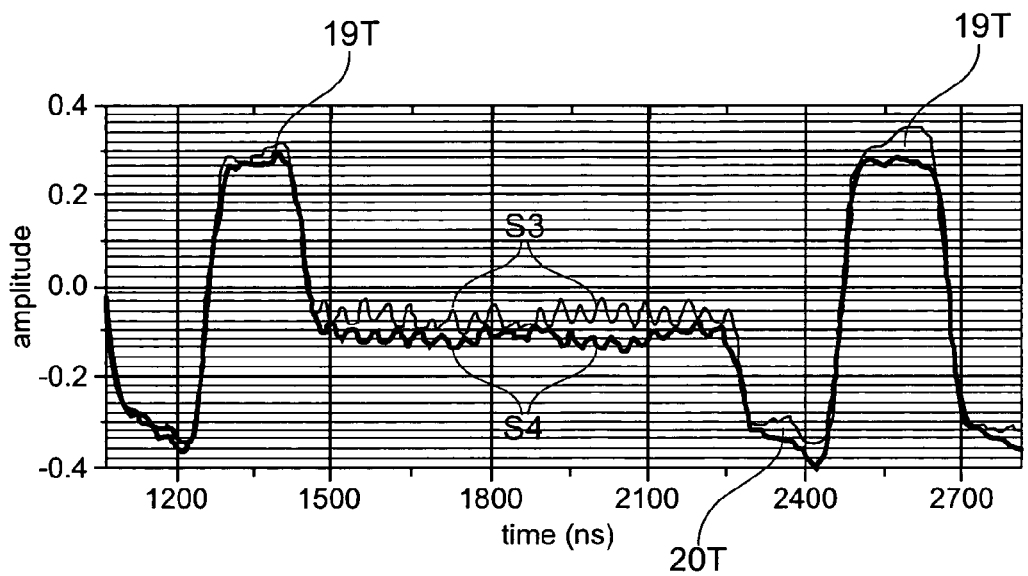

To study this effect in more detail, super-resolution discs comprising a sequence of 20 pits with length of 2T=100 nm, separated each by a 2T land, which are arranged between a 19T land and a 20T pit followed by a 19T land were manufactured for both materials InSb and AgInSbTe. The results are shown in FIG. 3. As expected, for the pits and lands having a size above the diffraction limit, the signal amplitude is much larger than for the pits and lands below the diffraction limit. The nineteen 2T lands of the InSb disc show a higher reflectivity with regard to the 2T pits, signal S3, corresponding with the higher reflectivity of the two 19T lands, and the twenty 2T pits between the 19T land and the 20T pit are clearly resolved.

But the twenty 2T pits of the AIST disc, signal S4, shows a worse behaviour: The two 19T lands show also a higher reflectivity, but the twenty 2T lands of the AgInSbTe disc show a lower reflectivity, in contrast with the twenty 2T pits of the InSb disc, signal S3. Because of the inversed signal S4 of the 2T pits, for the AgInSbTe disc only nineteen 2T pits can be resolved. Therefore, when a random sequence with data is provided, having pits below the diffraction limit and pits above the diffraction limit, the data cannot be decoded correctly for an AgInSbTe disc.

To explain this behaviour, numerical simulations have been made for aperture type super-resolution discs, i.e. AgInSbTe, which yielded the result that the reflectivity increases on pit and decreases on land when the pits and lands are below the diffraction limit, and decreases for pits and increases for lands when they have a size above the diffraction limit. When the pits have a size corresponding with the diffraction limit, there is a competition between the diffractive read out responsible for the detection of the larger pits, and the super-resolution mechanism responsible for the detection of the pits below the diffraction limit, for the material AgInSbTe. With regard to the super-resolution disc comprising an InSb layer, the results are consistent with the diffractive read out of the pits, which provides a increased reflectivity for lands and an decreased reflectivity for pits, independently whether they have a size below or above the diffraction limit. Therefore, the signals of the 2T pits of the AgInSbTe super-resolution disc are inversed with regard to 20T pits, as can be seen in FIG. 3.

Figure 4:
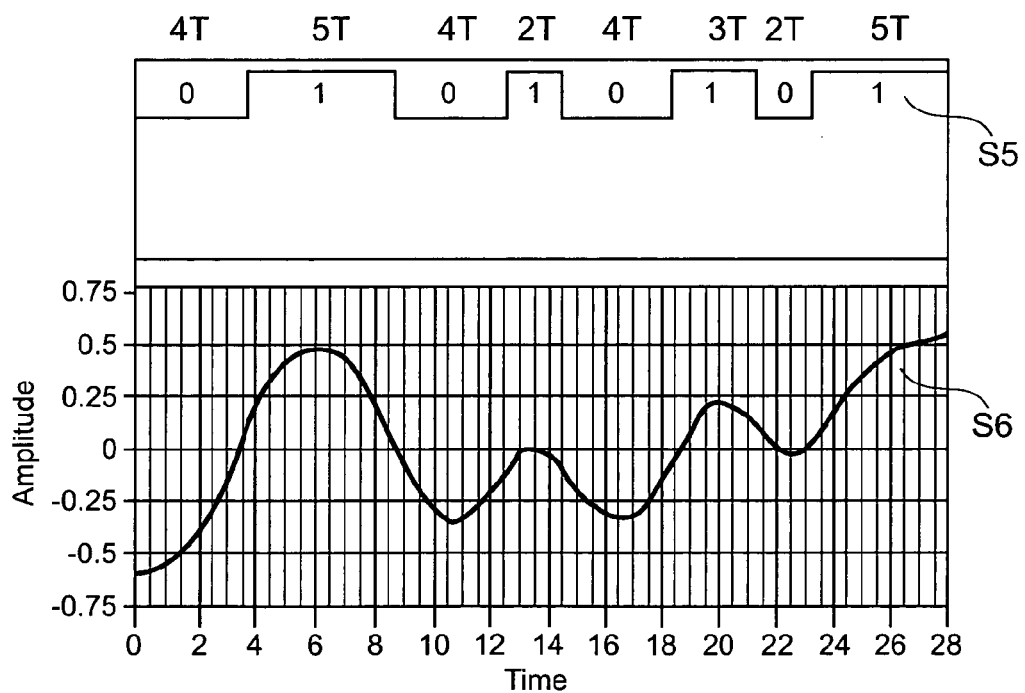

In FIG. 4, a calculated HF signal S6 is shown for a random sequence of pits and lands, graph S5, for a super-resolution disc comprising an InSb mask layer. The pits and lands of the graph S6 have a size from 2T to 5T as indicated, lands represented by a logical "1" and pits represented by "0". The simulation result, graph S6, shows clearly a lower reflection for the pits having a size above and below the diffraction limit, and show a higher reflection for lands of all sizes. Therefore, all pits can be clearly resolved and consequently detected by a pickup, when reading the data of the graph S5 arranged on a track of the InSb super-resolution disc.

Figure 5:
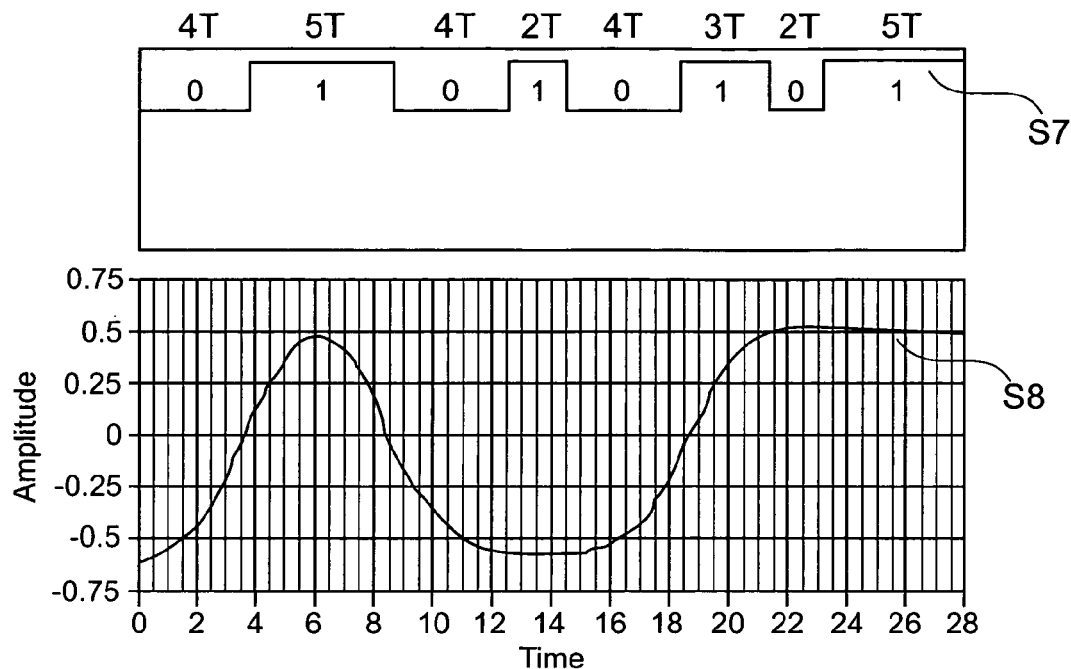

The situation for a super-resolution disc comprising an AgInSbTe mask layer as a super-resolution layer is shown in FIG. 5: The graph S7 corresponds with the same pit and land sequence of graph S5 of FIG. 4 and the signal S8 shows the respective calculated HF signal for the AgInSbTe disc. The 5T and 3T lands have a higher amplitude corresponding with a higher reflectivity and the 4T pits have a lower amplitude corresponding with a lower reflectivity. But the 2T pit shows a higher reflectivity and the 2T land shows a lower reflectivity, due to the inversion of the signal for pits and lands having a size below the diffraction limit, as described above, and therefore, they cannot be decoded because their signal is included in the larger pits and lands. The 2T pits and 2T lands included in the signal S8 cannot be resolved.

To overcome this problem, the pits and lands having a size below the diffraction limit of a corresponding optical pickup are arranged on a further level of the data layer of the optical storage medium. For example, the pits having a size below the diffraction limit are arranged on a third level of the data layer, and the lands having a size below the diffraction limit are arranged on a fourth level of the data layer.

Figure 6:
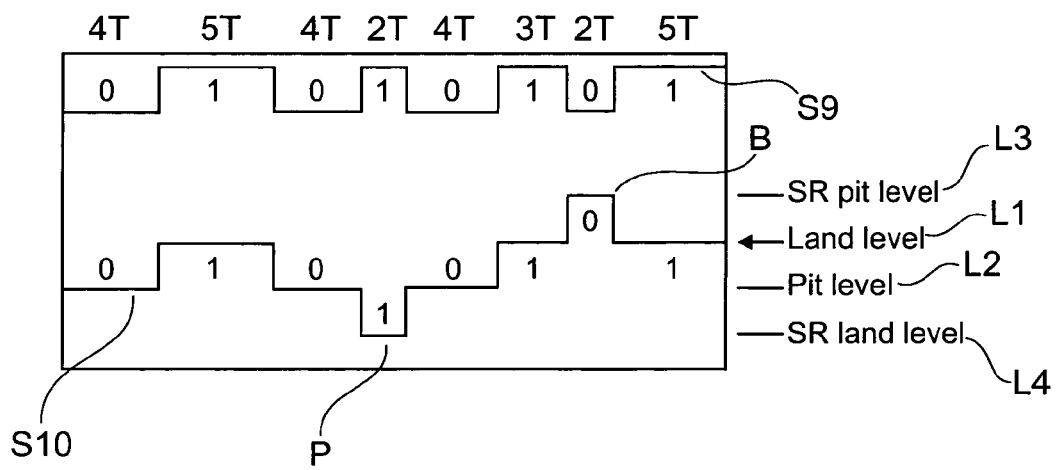

An example of an optical storage medium with a four level data layer is shown in FIG. 6. A graph S9 shows a sequence of data comprising pits and lands having a size above the diffraction limit and 2T pits and lands having a size below the diffraction limit of a corresponding optical pickup, as described with regard to graphs S5 and S7 of FIGS. 4 and 5. The data signal S6 is coded on the optical storage medium into a track having a four level data layer as shown by graph S10. The land level L1 is the reference plane of the optical storage medium, corresponding with the plane of the substrate layer, before the data layer is generated by embossing the pit structure corresponding with graph S9 on the substrate layer with a stamper. The land level L1 represents the lands of the track having a size above the diffraction limit, in the shown embodiment the 3T and 5T lands of graph S9 representing a logical "1".

The second level of the data layer is the pit level L2 representing the pits having a size above the diffraction limit, in this example the 4T pits of graph S9 representing a logical "0". The 2T pits having a size below the diffraction limit are arranged as bumps B on the land level L1, representing a third level L3 of the data layer, a super-resolution pit level. The 2T lands of graph S6 are represented as pits P below the pit level L2, representing a fourth level L4, a super-resolution land level. The bumps B and pits P are therefore inversed with regard to the 2T pits of graph F6 and the pits and lands of the data layer S8 having a size above the diffraction limit, which leads to the four level data layer.

When reading the data of an optical storage medium comprising an AgInSbTe mask layer as a super-resolution layer and a data layer as shown in FIG. 6, the data signal for the 2T pits and lands of data layer S8 is inversed as described with regard to FIG. 3, and because of the inversed pit and bump structure of the 2T pits and lands, the correct data signal S9 will be decoded because of the double inversion. The decoded signal for the data layer, graph S10, will correspond therefore with the graph S6 as shown in FIG. 4, and not with the graph S8 as shown in FIG. 4.

For producing a four level data layer of an optical storage medium as described with regard to FIG. 6, a corresponding stamper having a four level pit and land structure can be used.

Also other embodiments of the invention may be utilized by a person skilled in the art without departing from the spirit and scope of the present invention. The optical storage medium as described is in particular a read only optical disc but the invention may be applied also to recordable optical storage media comprising a three or a four level recordable data layer. The invention resides therefore in the claims herein after appended.

The invention claimed is:
1. Optical storage medium comprising
   a substrate layer,
   a data layer having a pit/land data structure with data arranged in tracks on the substrate layer, and
   a nonlinear layer with a super-resolution structure disposed on the data layer, wherein pits and lands having a size above a diffraction limit of a pickup for reading of the data establish a first and a second level of the data layer, wherein pits having a size below the diffraction limit are arranged on a third level of the data layer, and lands having a size below the diffraction limit are arranged on a fourth level of the data layer.

2. Optical storage medium according to claim 1, wherein lands having the size above the diffraction limit constitute the first level of the data layer, and pits having the size above the diffraction limit constitute the second level.

3. Optical storage medium according to claim 2, wherein the first level is the reference level of the data layer, the second level is designed as pits within the first level, the third level is designed as bumps on the first level and the fourth level is designed as pits within the second level.

4. Optical storage medium according to claim 1, wherein the super-resolution structure comprises a phase-change material.

5. Optical storage medium according to claim 4, wherein the phase-change material is a chalcogenide material comprising GeSbTe or AgInSbTe.

6. Optical storage medium according claim 1, comprising further a cover layer above the nonlinear layer, the storage medium being designed for operation with a laser beam penetrating first the cover layer.

7. Optical storage medium according claim 6, comprising further a first dielectric layer arranged between the nonlinear layer and the data layer and a second dielectric layer arranged between the nonlinear layer and the cover layer.

8. Optical storage medium according to claim 1, wherein the pits and lands of a track having a size below the diffraction limit are 2T and/or 3T pits and lands.

9. Optical storage medium according to claim 8, wherein the diffraction limit is defined as lambda/4NA.

10. Optical storage medium according claim 1, wherein the optical storage medium is a read-only optical disc.

* * * * *